April 11, 1961 M. FROMMER 2,978,955
DETACHABLE MOUNT FOR OPTICAL DEVICES ON SPECTACLE FRAMES
Filed July 3, 1957 2 Sheets-Sheet 1

INVENTOR
MOSES FROMMER
BY
ATTORNEY

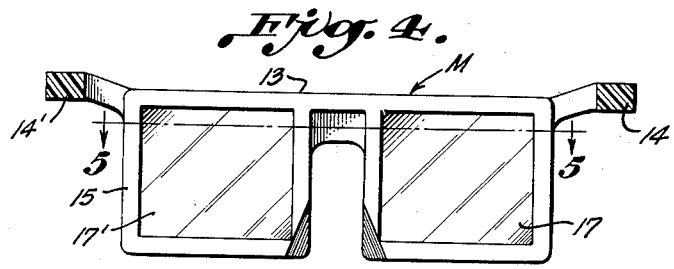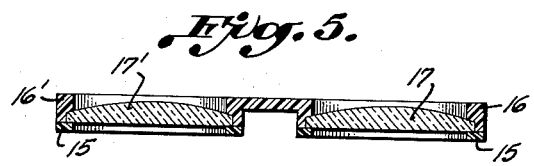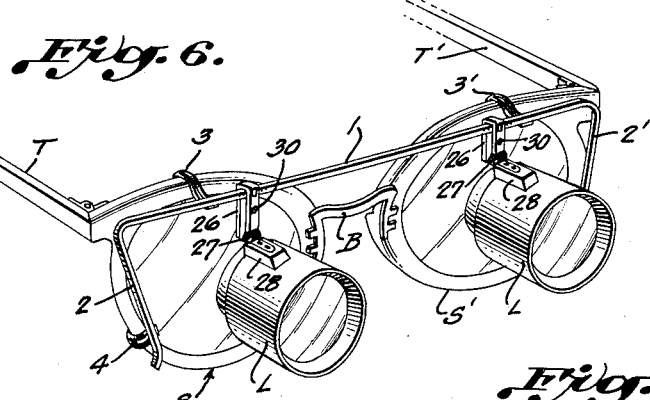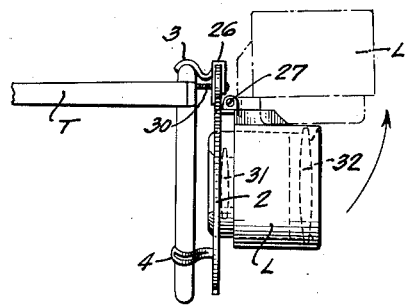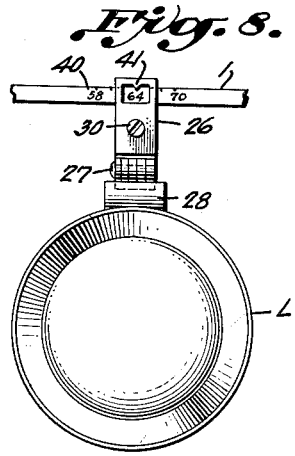

United States Patent Office 2,978,955
Patented Apr. 11, 1961

2,978,955
DETACHABLE MOUNT FOR OPTICAL DEVICES ON SPECTACLE FRAMES
Moses Frommer, 1646 Carroll St., Brooklyn, N.Y.
Filed July 3, 1957, Ser. No. 669,804
2 Claims. (Cl. 88—41)

This invention relates to detachable mounts for spectacle frames, and more particularly to clip-on units adapted to mount optical devices such as magnifiers, binoculars and other optical lens assemblies, which may be swung readily from an operative to an inoperative position while they remain mounted upon the spectacle frames.

It is an object of the present invention to provide detachable mounts for spectacle frames which are simple and rugged in construction and economical in cost, and upon which may be pivotally mounted optical devices of different forms to meet varying needs.

It is another object of the invention to provide a detachable mount for a spectacle frame which provides a secure support on the frame while rendering possible an easy shifting of optical devices which may be connected to the detachable mount from an operative to an inoperative position, without affecting the security of the attachment of the mount upon the spectacle frame.

The detachable mount is adapted to be used on spectacle frames of all types of construction, such as rimless, combination metal and plastic, or all plastic, and the optical devices may assume the form of simple magnifiers which are readily interchangeable for attaining different powers of magnification at different working distances, binoculars which may be adjusted for varying pupillary distances, or exercising prisms which are used in the field of orthoptics.

The invention proceeds upon the principle of providing a horizontal spring metal bar having integral arms extending downwardly therefrom, with securing clips provided on the horizontal portion of the bar as well as on the integral arms for engagement with the spectacle frame at multiple points in order to obtain a secure mounting therefor. The spring metal bar is preferably formed of rectangular cross-section in order to facilitate the mounting of brackets thereon which in turn hingedly support the optical devices to permit a swinging movement of the latter about a horizontal axis adjacent to the horizontal metal bar to bring the optical devices forwardly of the spectacle frame into operative position or above the spectacle frame adjacent to the forehead of the wearer into inoperative position. In the case of binoculars, which are mounted upon a unitary supporting frame, hinged brackets on the latter which are affixed to the horizontal metal bar permit a swinging movement of the binoculars as a unit from an operative to an inoperative position. On the other hand, the clip-on unit in accordance with the invention permits a convenient mounting of individual lens units upon the horizontal bar at varying distances in accordance with different pupillary spacings, so that the lens units may be swung from operative to inoperative positions individually, and because there is no unitary cumbersome frame support for both lens units, a light construction is attained.

Other objects and purposes will appear from the detailed description of the invention described hereinafter taken in conjunction with the accompanying drawings, wherein:

Fig. 4 is a vertical sectional view along line 4—4 of Fig. 2;

Fig. 5 is a horizontal sectional view along line 5—5 of Fig. 4;

Fig. 6 is a perspective view of a different embodiment of the invention illustrating a clip-on unit mounting discrete binocular lens units in operative position;

Fig. 7 is a side elevation of the arrangement shown in Fig. 6 illustrating the alternative positions of the binocular lens units in dotted lines; and Fig 8 is an enlarged view of the mounting of one of the optical devices shown in Fig. 6 upon the clip-on bar to facilitate a predetermined variable spacing between the binocular lens units.

Figure 1:
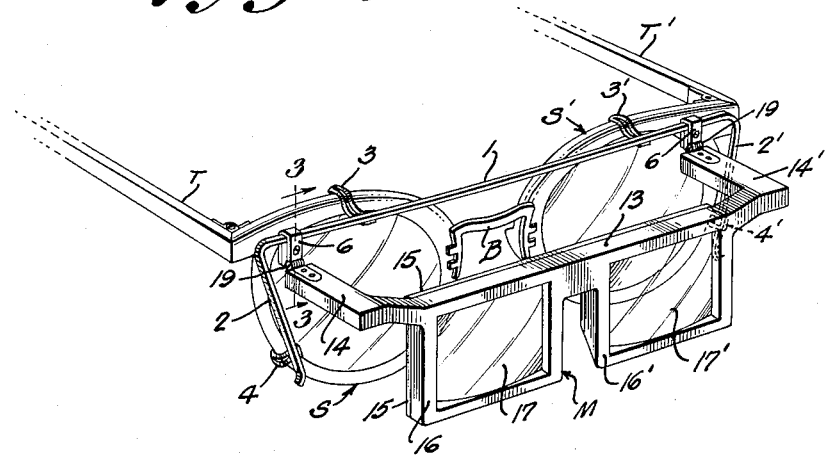
Fig. 1 is a perspective view of the clip-on unit in accordance with the invention for mounting a magnifying optical device upon a spectacle frame.

As shown in the drawings, the clip-on unit is detachably mounted upon the spectacle frame which may be formed of plastic and consists of lens supports S with the intermediate nose bridge B therebetween and the temples T—T' extending from the distal ends of the spectacle frame. The clip-on unit is formed of the horizontal supporting bar 1 which extends substantially across the length of the spectacle frame and from the opposite ends of which extend inwardly and downwardly the integral arms 2, 2'.

The bar 1 and arms 2 are preferably formed of metal of square cross-section which may be gold-filled and which is characterized by a high degree of resilience. Hooks 3 and 3' are affixed to the bar 1 in position to engage the top edge of the spectacle mounts S and S' and additional hooks 4 and 4' are welded or soldered near the ends of the arms 2 and 2', respectively, to engage the lateral sides of the lens mounts S and S', so that the multiple points of engagement of the clip-on unit with the spectacle frame results in a secure support of the unit on the frame, despite the fact that the unit is readily detachable from the spectacle frame when the arms 2 and 2' are sprung from engagement with the lens mounts.

An inverted U-shaped bracket 6 extends over the bar 1 near each end thereof and the opposite arms of the bracket straddle the bar 1. An apertured vertical arm or plate 10 is connected to bracket 6 by means of the headed screw bolt 7 extending through the arms of the U-shaped bracket 6 and an opening in the plate 10. In lieu of the bolt head 8 having a kerf therein, a hand-operated knurled head may be employed to interconnect the bracket arm 10 with the supporting bracket 6. By tightening each bolt 7, bracket arms 10 are fixed in position having hinges 11 at their lower ends pivotally supporting the rearwardly extending arms 14 and 14' of the magnifier frame M. The fastening of the hinge elements embodying pintles 21 to the magnifier frame by means of rivets 20 is conventional and such arrangements are well-known in the field of optical mountings.

The magnifier frame is illustrated as formed of plastic material having a top bar 13 for supporting the two lens frames 16 and 16' which are backed by plastic layer 15 following the seating of magnifying lenses 17 and 17' in the lens frames 16 and 16'. The arms 14 extending from the opposite ends of the top bar 13 in which are fixed the hinge components 19 by means of rivets 20 are of solid construction in order to make possible the swinging of the magnifier frame about the pintles 21 without undue wear of the parts.

Figure 2:
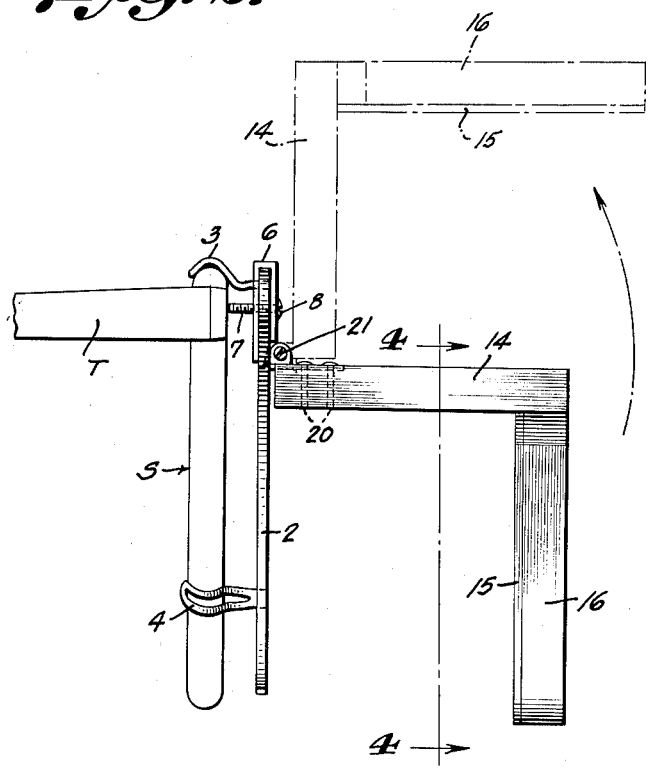
Fig. 2 is a side elevation of the mounting of the magnifier upon the spectacle frame with the magnifier in inoperative position being shown in dotted lines.
Figure 3:
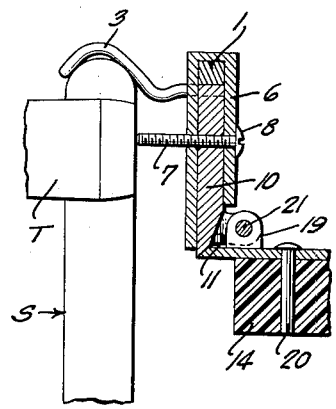
Fig. 3 is a vertical sectional view along the line 3—3 of Fig. 1.

As shown in Fig. 2, the magnifier frame may be positioned forwardly of the lens mounts in order to obtain the desired magnification effects. On the other hand, the magnifier frame may be swung easily into the position shown in dotted lines when normal vision is sought to be had, and both of the alternate positions may be attained without affecting the security of the clip-on unit which is fixed detachably upon the spectacle frame, by means of spring clips 3 and 3' on the top horizontal bar and the spring clips 4 and 4' on the laterally extending arms 2 and 2'.

As shown in Figs. 4 and 5, the lenses 17 and 17' are fixedly secured in the magnifier frame and because of the economical construction thereof, several may be used interchangeably to obtain different powers of magnification at different working distances. The units may be interchanged easily by disengaging the bracket arms 10 from the supporting brackets 6 on the horizontal supporting bar and engaging the bracket arms 10 of another magnifier frame.

As shown in Figs. 6 to 8, the clip-on unit in accordance with the invention may be used to mount binocular lenses upon U-shaped brackets 26 which may be supported at spaced distances along the length of the horizontal supporting bar 1. Screw bolts 30 serve to fix the mounting of the brackets on the horizontal bar once the desired spacing is determined, and as shown in Fig. 8, indicia 40 may be engraved upon the bar 1 which cooperate with an index 41 on each bracket 26 to indicate the interpupillary distance between the binocular units to bring them into conformity with the interpupillary spacing of the user's eyes. Once the adjustment is made, the binocular loupes may remain fixed upon the horizontal bar even though the entire assembly may be detached in its entirety from the spectacle frame.

As shown in Figs. 6 to 8, a pintle 27 interconnects engaging component parts of hinged units mounted upon the binocular unit 28 and bracket 26 in order to permit a rotation of the binocular unit L from an operative position shown in solid lines in Fig. 7 to an inoperative position shown in dotted lines.

The eye-piece 31 and objective lenses 32 in the optical loupe or casing L may be varied to suit the needs of the individual user.

If a telescopic unit for a single eye is desired, one of the units L may remain in a raised position while the other is swung into operative position forwardly of the spectacle frame.

While the arrangement shown in Figs. 6 to 8 results in an extremely light construction by virtue of the fact that the bridging support for the binocular lens units has been eliminated in its entirety, the invention may be used with a unitary support for the lens units, in which case, the eye-pieces and objective lenses would be mounted in a supporting frame resembling that illustrated in Figs. 1 to 5 with respect to the magnifier frame.

In addition to magnifier frames and binoculars, other optical devices may be mounted on the clip-on unit rendering them easily detachable as well as swingable from operative to inoperative positions. Such additional optical devices may assume the form of exercising prisms which are used in the field of orthoptics for the correction of crosseyes and similar difficulties.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A detachable mount for a spectacle frame having a nose bridge, lens frames on opposite sides of said bridge and temples connected to said lens frames remote from said bridge, said mount consisting of a unitary horizontal metallic bar of rectangular cross-section extending across the top of said bridge and lens frames, a clip near each end of said bar for engaging the upper edge of each lens frame, integral substantially straight resilient arms extending downwardly and inwardly from the ends of said horizontal bar and each provided with a clip near the free end thereof for engagement with the distal side of the respective lens frame, metallic hinge brackets mounted on said horizontal bar each comprising an inverted U-shaped support resting non-rotatably on the top of said bar with the opposite arms of said support straddling said bar, a vertical plate extending upwardly between the opposite arms of said support and below said bar, a clamping bolt detachably interconnecting said plate and said arms with said bar, and an optical device hingedly connected to said vertical plates forwardly of said spectacle frame for movement about a horizontal axis to swing said optical device into predetermined operative position forwardly of said lens frames or alternatively into inoperative position above the lens frames.

2. A device as set forth in claim 1 wherein said vertical plates are disposed centrally of each lens frame and the optical device supported thereby is an individually mounted optical loupe.

References Cited in the file of this patent

UNITED STATES PATENTS

| | | |
|---|---|---|
| 444,495 | Johnston | Jan. 13, 1891 |
| 1,744,282 | Rollins et al. | Jan. 21, 1930 |
| 1,899,905 | Uhlemann | Feb. 28, 1933 |
| 2,132,346 | Richards | Oct. 4, 1938 |
| 2,155,575 | Wittig | Apr. 25, 1939 |
| 2,220,000 | Mowrer | Oct. 29, 1940 |
| 2,226,941 | Montalvo-Guenard | Dec. 31, 1940 |
| 2,545,673 | Pozarik | Mar. 29, 1951 |
| 2,574,749 | Mendelsohn | Nov. 13, 1951 |
| 2,818,774 | Olnhausen | Jan. 7, 1958 |

FOREIGN PATENTS

| | | |
|---|---|---|
| 27,321 | Great Britain | of 1911 |
| 279,668 | Switzerland | Mar. 17, 1952 |
| 1,084,994 | France | July 21, 1954 |